US010324428B2

(12) United States Patent
Bierie et al.

(10) Patent No.: US 10,324,428 B2
(45) Date of Patent: Jun. 18, 2019

(54) INTRA-SHOP CONNECTIVITY SYSTEM (71) Applicant: Carlisle Fluid Technologies, Inc., Charlotte, NC (US)

(72) Inventors: William K. Bierie, Liberty Center, OH (US); Jeffrey G. Bell, Toledo, OH (US)

(73) Assignee: Carlisle Fluid Technologies, Inc., Scottsdale, AZ (US)

(*) Notice: Subject to any disclaimer, the term of this patent is extended or adjusted under 35 U.S.C. 154(b) by 274 days.

(21) Appl. No.: 15/040,911

(22) Filed: Feb. 10, 2016

(65) Prior Publication Data

US 2016/0239003 A1 Aug. 18, 2016

Related U.S. Application Data (60) Provisional application No. 62/115,529, filed on Feb. 12, 2015.

(51) Int. Cl.
| | |
|---|---|
| *G05B 15/02* | (2006.01) |
| *B05B 12/12* | (2006.01) |
| *B05B 12/14* | (2006.01) |
| *B05B 12/08* | (2006.01) |
| *G06Q 10/08* | (2012.01) |
| *G06Q 30/06* | (2012.01) |
| *B01F 13/10* | (2006.01) |

(Continued)

(52) U.S. Cl.
CPC .......... *G05B 15/02* (2013.01); *B01F 13/1063* (2013.01); *B05B 12/084* (2013.01); *B05B 12/122* (2013.01); *B05B 12/149* (2013.01); *B05B 12/1418* (2013.01); *G06Q 10/087* (2013.01); *G06Q 30/0621* (2013.01); *B05B 7/02* (2013.01); *B05B 9/01* (2013.01)

(58) Field of Classification Search
CPC ..... B29C 59/16; B60R 11/02; B60R 11/0205; G06F 11/00; G06F 21/10; G06F 21/71; G06F 2211/007; G06F 2221/0797; G06F 2221/2105; G06F 2221/2137; G06F 2221/2107; G06F 21/84; G06F 21/62; G06F 3/041; G06F 16/958
See application file for complete search history.

(56) References Cited

U.S. PATENT DOCUMENTS

| | | | |
|---|---|---|---|
| 4,722,625 | A | 2/1988 | O'Brien |
| 5,099,687 | A | 3/1992 | Lunzer et al. |
| 5,182,704 | A | 1/1993 | Bengtsson |

(Continued)

FOREIGN PATENT DOCUMENTS

| | | |
|---|---|---|
| DE | 102006056879 A1 | 6/2008 |
| EP | 2641661 A1 | 9/2013 |

(Continued)

OTHER PUBLICATIONS

PCT International Search Report and Written Opinion; Application No. PCT/US2016/017624; dated Jun. 9, 2016; 10 pages.

(Continued)

*Primary Examiner* — Robert G Bachner
(74) *Attorney, Agent, or Firm* — Fletcher Yoder, P.C.

(57) ABSTRACT

A system includes a terminal configured to intake a vehicle into a service shop, a server configured to store vehicle data associated with the vehicle, and, a scanner configured to identify the vehicle and relay timing and location information about the vehicle to the server.

18 Claims, 4 Drawing Sheets (51) Int. Cl.
    *B05B 7/02*    (2006.01)
    *B05B 9/01*    (2006.01)

(56) References Cited

U.S. PATENT DOCUMENTS

| | | |
|---|---|---|
| 5,636,653 A | 6/1997 | Titus |
| 6,059,884 A | 5/2000 | Seitz et al. |
| 6,149,071 A | 11/2000 | MacCallumMhor et al. |
| 6,500,262 B1 | 12/2002 | Bednarz et al. |
| 6,543,647 B1 | 4/2003 | Buchholz |
| 6,628,829 B1 | 9/2003 | Chasen |
| 6,896,152 B2 | 5/2005 | Pittman et al. |
| 6,935,575 B2 | 8/2005 | Lacchia et al. |
| 7,024,285 B2 | 4/2006 | Saelens |
| 7,264,160 B2 | 9/2007 | Polarine et al. |
| 7,504,338 B2 | 3/2009 | Du et al. |
| 7,743,055 B2 | 6/2010 | Rodrigues et al. |
| 7,747,615 B2 | 6/2010 | Rodrigues et al. |
| 77,926,611 | 9/2010 | Scheer |
| 7,822,845 B2 | 10/2010 | Polarine et al. |
| 8,109,685 B1 | 2/2012 | Vito |
| 8,561,921 B1 | 10/2013 | Showman et al. |
| 8,601,977 B2 | 12/2013 | Mauchle et al. |
| 2002/0007237 A1* | 1/2002 | Phung ............... G05B 23/0216 701/31.4 |
| 2004/0046051 A1* | 3/2004 | Santa Cruz ......... B01F 13/1055 239/303 |
| 2005/0011967 A1 | 1/2005 | Skelton-Becker et al. |
| 2005/0218245 A1* | 10/2005 | Jarvis ................ B05B 12/004 239/68 |
| 2007/0017443 A1 | 1/2007 | Skelton-Becker et al. |
| 2007/0032965 A1 | 2/2007 | McClanahan et al. |
| 2007/0145113 A1* | 6/2007 | Keller ................... G06K 17/00 235/377 |
| 2010/0161141 A1 | 6/2010 | Herre et al. |
| 2010/0319176 A1 | 12/2010 | Stewart et al. |
| 2012/0009329 A1 | 1/2012 | Mather et al. |
| 2012/0072035 A1 | 3/2012 | Nielsen et al. |
| 2012/0109660 A1 | 5/2012 | Xu et al. |
| 2012/0254141 A1* | 10/2012 | Poland ..................... B05D 5/06 707/705 |
| 2012/0321485 A1 | 12/2012 | Proietti De Marchis |
| 2013/0083991 A1* | 4/2013 | Rodrigues ............. B05D 5/005 382/141 |

FOREIGN PATENT DOCUMENTS

| | | |
|---|---|---|
| JP | 2000085864 A | 3/2000 |
| JP | 2004337838 A | 12/2004 |
| JP | 2009101319 A | 5/2009 |
| JP | 2009154087 A | 7/2009 |
| WO | 2011/163579 A1 | 12/2011 |
| WO | 2011/163583 A1 | 12/2011 |

OTHER PUBLICATIONS

Binks; "Global Electronic Mix Solutions—Plural Component Mixing System"; Operation Manual; dated Jul. 2015; 62 pages.
Binks; "Global Electronic Mix Solutions—Plural Component Mixing System"; Enhanced Troubleshooting Manual; dated 2013; 46 pages.
Binks; "GEMS Global Electronic Mix Solutions—Beyond Accurate Mixing"; dated 2015; 4 pages.
Binks; "GEMS Global Electronic Mix Solutions—Feeling Pressure to Improve Your Finishing Process?"; dated 2015; 2 pages.
Australian Examination Report for AU Application No. 2016219217 dated Jul. 20, 2018, 4 pgs.
Japanese Office Action for JP Application No. 2017-542134 dated Jul. 24, 2018, 3 pgs.
Japanese Office Action for JP Application No. 2017-542134 dated Apr. 2, 2019, 11 pgs.

* cited by examiner

INTRA-SHOP CONNECTIVITY SYSTEM

CROSS-REFERENCE TO RELATED APPLICATION

This application is a non-provisional application claiming priority to U.S. Provisional Patent Application No. 62/115,529, entitled "INTRA-SHOP CONNECTIVITY SYSTEM", filed Feb. 12, 2015, which is herein incorporated by reference in its entirety for all purposes.

BACKGROUND

The present disclosure relates generally to service shops and various tools and equipment used in service shops.

Service shops, such as paint shops or service shops, may employ a number of processes and operators working simultaneously to accomplish jobs for customers. In many instances, the different processes being done by different operators may involve disjointed technologies in which there is little operator to operator communication through the shop as a whole. The lack of communication may result in bottlenecks that are unrecognized and cause inefficiencies throughout the service shop.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In an embodiment, a system includes a terminal configured to intake a vehicle into a service shop, a server configured to store vehicle data associated with the vehicle, and, a scanner configured to identify the vehicle and relay timing and location information about the vehicle to the server.

In another embodiment, a method includes receiving, with a processor, vehicle identification information and service information, storing the vehicle identification information and service information on a server, receiving, from a first scanner, a first scan identifying the vehicle, determining, with the processor, a start time of a repair, a paint job, or any combination thereof based on the first scan, and conveying the identification of the vehicle and the start time to the server.

In another embodiment, a system includes an intra-shop connectivity system, having a server configured to store vehicle data associated with the vehicle, a scanner configured to identify the vehicle and relay timing and location information about the vehicle to the server, and a paint mixer configured to mix an amount of a color of paint when the vehicle is identified by the scanner.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

As discussed in detail below, the disclosed embodiments include systems and methods used within a service shop (e.g., body shop, paint shop, etc.) to unify and streamline the service and repair of components by the shop. The service shop may thus include an intra-shop connectivity system that communicates with various systems (paint sprayer, paint mixer, central component intake kiosk, etc.) to obtain location, time, color, repair, and other information about the components. Thus, rather than relying on paper charts and notifications, a service shop may be able to centrally locate and monitor the service of each vehicle. Furthermore, bottlenecks in service and repair, usage amount of paint and finishes, and other information may be tracked to eliminate slow-down and enable smart decisions concerning purchases and customer service by the service shop. In the following discussion, the intra-shop connectivity system is introduced in context of a service shop for vehicle repair and service, yet the disclosed embodiments may be used in any service shop or facility with any suitable tools and equipment.

Figure 1:
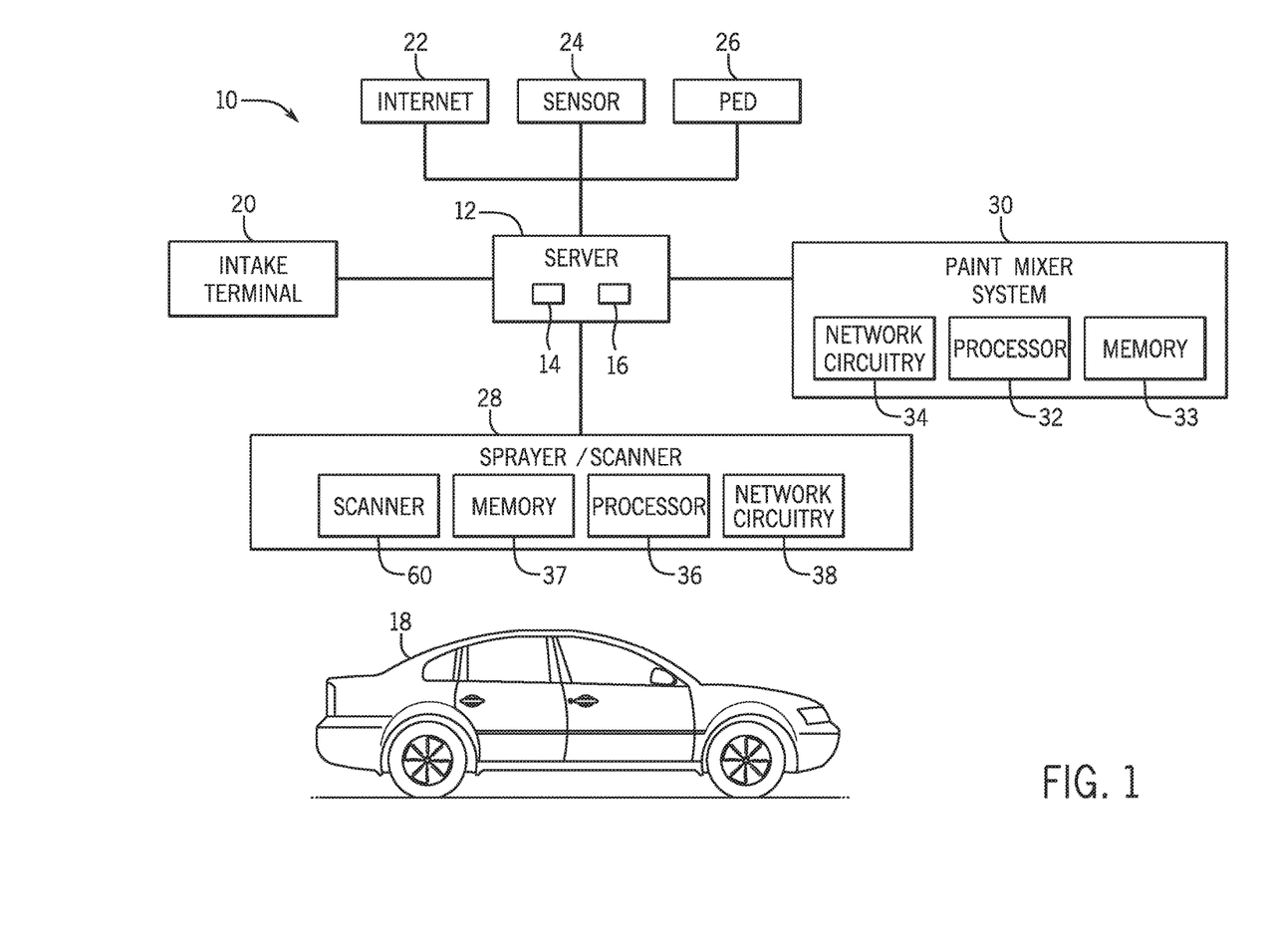
FIG. 1 is a block diagram of an embodiment of an intra-shop connectivity system.

FIG. 1 is a block diagram of an embodiment of an intra-shop connectivity intra-shop connectivity system 10. The intra-shop connectivity system 10 includes a server 12 that connects and/or communicates with various components and subsystems of the intra-shop connectivity system 10. The server 12 may include a processor 14 and storage 16 to store and distribute the information collected by the various components and subsystems of the intra-shop connectivity system 10. The processor 14 may provide the processing capability to execute the operating system, programs, user and application interfaces, and any other functions of the server 12. The processor 14 may include one or more microprocessors, such as one or more "general-purpose" microprocessors, one or more special-purpose microprocessors or ASICS, or some combination of such processing components. For example, the processor 14 may include one or more reduced instruction set (RISC) processors, as well as graphics processors, video processors, audio processors, and the like. As will be appreciated, the processors 18 may be communicatively coupled to one or more data buses or chipsets for transferring data and instructions between various components of the server 12. The storage 16 may include volatile or non-volatile memory configured to store information such as identification information (e.g., vehicle identification number, manufacturer's part number, model number, etc.), ordered job (e.g., job code or identification number), order date, order time, scheduled time of job completion, color of paint (e.g., paint code or identification number), replacement parts that have been ordered, owner's identification and contact information, assigned operator, or other information relating to a vehicle 18.

The vehicle 18 may be a customer's vehicle 18 that is, for example, submitted for service at the service shop. Identification information such as make, model, color, prior services, etc. may be collected and input into an intake terminal 20. The intake terminal 20 may include a desktop computer located, for example, at a front entrance/checkout location where customers interact with employees of the service shop. In some embodiments, the intake terminal may be a personal electronic device (PED), such as a tablet computer, smartphone, laptop, etc. In addition to the intake terminal 20, the intra-shop connectivity system 10 may include an internet protocol 22 configured to download and upload information (e.g., the identification information) from the internet (wired or wireless). For example, a customer may input the identification information via a web interface before bringing the vehicle 18 to the service shop. Additionally, information about suggested repairs, pricing estimates and results, expected time for completion of repairs, and other information about the vehicle 18 and the service provided by the service shop may be communicated to a customer through the internet 22.

Local-area network devices may also be connected to the server 12 from within the service shop. As an example, the intra-shop connectivity system 10 may include sensors 24 that detect useful information, such as a location of the vehicle 18, repair start and end times, environmental conditions (e.g., temperature, humidity, pressure, etc.), among others. The system may also include personal electronic devices (PEDs) 26 that wirelessly connect to the server 12. Employees may use the PED 26 to interact with the server 12 from anywhere within the service shop. For example, a paint technician may use the PED 26 to lookup information on the server 12 to determine which vehicle 18 is next in the queue for repairs. Since the PED 26 may receive this information from the server 12 at any location within the service shop, the paint technician does not have to check a paper list that may be located far away or may be misplaced. The PED 26 ensures that each employee, manager, and/or customer has access to all information that has been entered into the server 12. As explained in detail below, the intra-shop connectivity system 10 may also include a sprayer/scanner 28 configured to scan information and perform operations within the service shop. The sprayer/scanner 28 may include on-board circuitry components that store and process data for conveyance to the server 12. For example, the sprayer/scanner may include a processor 36, memory 37, network circuitry 38, and a scanner 60 (explained in detail below).

In some embodiments, the server 12 may also be configured to interact with components or subsystems of the intra-shop connectivity system 10 to automatically start processes within the service shop, improving efficiency. For example, the intra-shop connectivity system 10 may include a paint mixer system 30 that automatically mixes an amount of paint when the sensor 24, PED 26, etc detects a job is ready for painting. The paint mixer system 30, like the sprayer/scanner 28, may include on-board circuitry components that store and process data received from the server 12. For example, the paint mixer system 30 may include a processor 32, a memory 33, and/or network circuitry 34.

The color and/or amount of paint to be either fed to the sprayer/scanner 28 or dispensed for use with a gravity or suction feed sprayer/scanner 28. may be determined by input from an employee, or may be based on the identification information previously entered into the server 12 (e.g., through the intake terminal 20, internet 22, sensors 24, PED 26, or sprayer/scanner 28). Thus, each component of the intra-shop connectivity system 10 may cooperatively provide information rather than having all pieces of information stored in multiple physical and digital locations, or having some pieces of information in one location while other information is in a different location.

Figure 2:
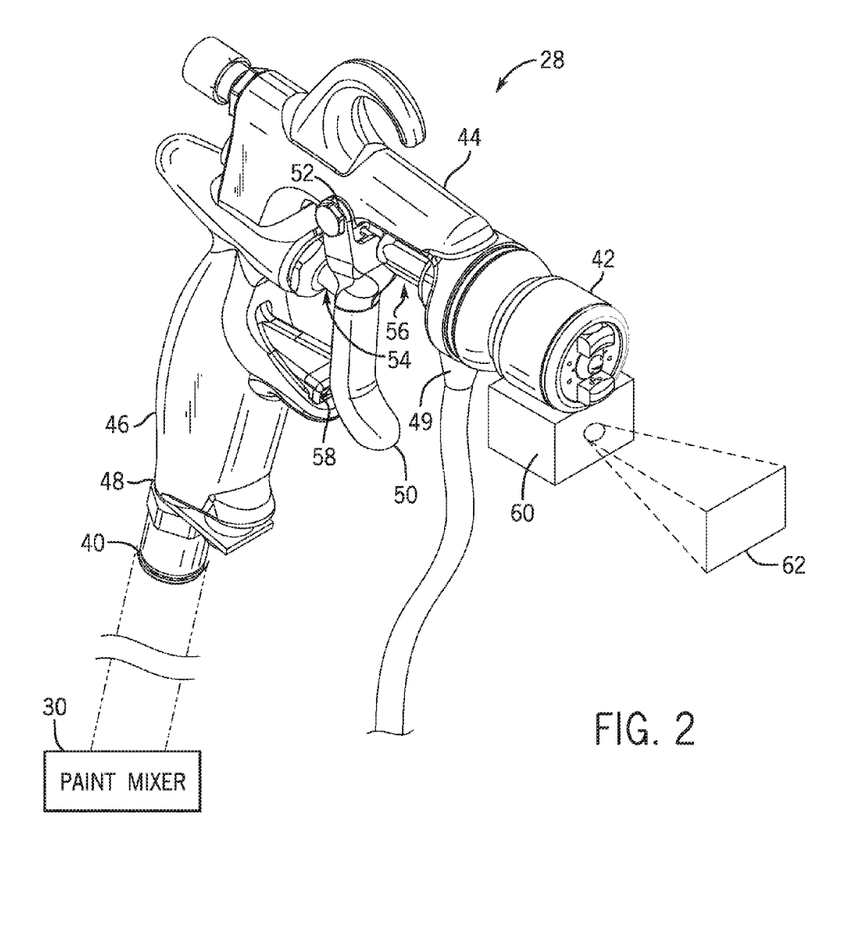
FIG. 2 is a perspective view of an embodiment of a sprayer that may be used as part of the intra-shop connectivity system of FIG. 1.

FIG. 2 is a perspective view of an embodiment of the sprayer/scanner 28 that may be used as part of the intra-shop connectivity intra-shop connectivity system 10 of FIG. 1. The sprayer/scanner 28 may be directly connected to the paint mixer system 30 via a hose 40 that may supply paint and/or air pressure to the sprayer/scanner 28. In certain embodiments, the sprayer/scanner 28 is an airless spray coating gun or an air-assisted spray coating gun (e.g., a spray gun that atomizes the liquid with air atomization mechanisms.) In certain other embodiments, the sprayer/scanner 28 may receive air through the hose 40 while receiving paint that has been mixed in the paint mixer 30 but is dispensed for use with a gravity or suction feed spray-gun. For example, the gravity feed spray-gun container may be disposable or metal reusable containers. In such embodiments, the paint mixer 30 may possibly mix the paint in a separate location and then the container may be attached to the sprayer/scanner 28. In operation, an air-assisted spray coating gun may also include air jets configured to shape the liquid spray in the desired pattern, e.g., flat, conical, hollow, and so forth.

Furthermore, the sprayer/scanner 28 may include a head assembly 42 coupled to a body assembly 44. The illustrated body assembly 44 includes a handle 46, an air supply coupling 48 disposed at the handle 20, and a liquid supply coupling 49. The body assembly 44 also includes a trigger 50 rotatably coupled to a pivot joint 52. In turn, the trigger 50 is movably coupled to an air valve assembly 54 and a liquid valve assembly 56, such that the trigger simultaneously controls the passage of air and liquid through the sprayer/scanner 28. In addition, the body assembly 44 includes a scanner initiation assembly 58 in close proximity to the trigger 50. The scanner initiation assembly 58 enables a user to initiate a scanning operation by a scanner 60. The scanner initiation assembly 58 may be located proximately to the trigger 50 to enable quick activation of the scanner 60, while holding the sprayer/scanner 28. In operation, the scanner 60 may be activated to identify (e.g., scan) a code on the vehicle 18, vehicle replacement parts, paint containers or other service related goods. For example, the scanner 60 may scan an identification label 62 with identification information printed on it and attached to the vehicle 18. For example, the label 62 may include a bar code, quick response (QR) code, a radio frequency identification code (RFID tag), an alphanumeric code, an alphanumeric information label, or other device with or containing a scannable indicia. Accordingly, the scanner 60 may include a bar code scanner, a QR code scanner, an RFID tag scanner, or any combination thereof. In some embodiments, the scanner 60 may identify a vehicle identification number (V.I.N.) of the vehicle 18 through a digital image of the V.I.N. location. In still further embodiments, the scanner 60 may include a camera that enables color detection of the component (e.g., vehicle 18).

Figure 3:
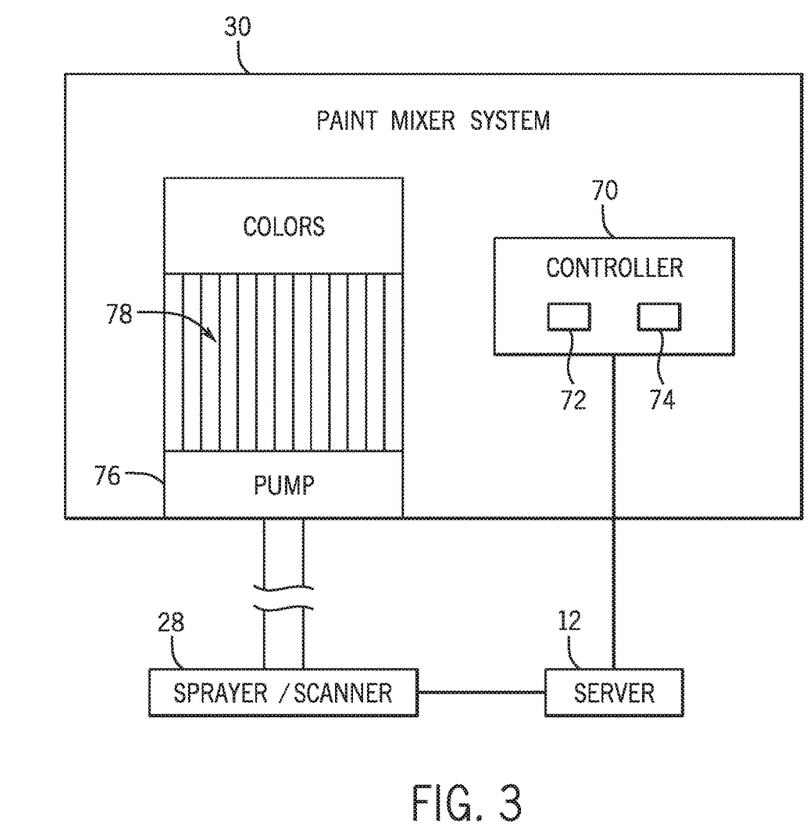
FIG. 3 is a schematic diagram of an embodiment of a paint mixer system that may be used as part of the intra-shop connectivity system of FIG. 1.

FIG. 3 is a schematic diagram of an embodiment of the paint mixer system 30 that may be used as part of the intra-shop connectivity system 10 of FIG. 1. The paint mixer system 30 may be connected to the server 12 via a controller 70 that has a processor 72 and memory 74. The processor 72 may receive instructions electronically from the server 12 and/or the scanner 60 (e.g., paint quantity, paint color, ratio of plural components of paint to mix to achieve paint color, time to mix paint, scheduled time to complete mix of paint, etc.) while the memory 74 may store instructions for mixing paint. As an aside, when "paint" is used in describing the paint mixer, it may be understood that other liquids may also be used in the mixer such as hardeners, lacquers, stains, waxes, etc. The paint mixer system 30 also includes a pump 76 that pressurizes the paint for conveyance to the sprayer/scanner 28. In gravity feed embodiments of the sprayer/scanner 28, the paint mixer system 30 may include a pump 76 that provides only air to the sprayer/scanner 28. The pump 76 may pump paint from one or more color reservoirs 78 that include different colored paint. In operation, the controller 70 uses the information in the memory 74 to control the amount and type of paint to mix from the color reservoirs 78, for example to match the color of the vehicle 18. In some embodiments, the processor 72 may receive the correct colors and amounts to be fixed from the server 12. The color information that the controller 70 tries to match may come from a manufacturer's list, a picture taken by the scanner 60, a previously performed job for the vehicle 18, or a color manually selected by an operator. The paint mixer system 30 may begin mixing paint as soon as a signal is received from the server 12, which in turn may send a signal as soon as receiving a signal from the sprayer/scanner 28. Thus, in practice, a paint technician may scan the vehicle 18, begin paint preparations, while the paint mixer system 30 prepares the paint.

Additionally, the paint mixer may save material costs by accurately monitoring and measuring the paint that is used by the sprayer/scanner 28. For example, the paint mixer system 30 may mix an amount of paint so that no paint is left over after the vehicle 18 is painted. In some embodiments, rather than mixing a batch of paint, with extra to ensure coverage, the paint mixer system 30 may concurrently mix and pump the paint in real time so that only unmixed paint is left over after completion of the paint job. In some embodiments, the server 12 may have information about how much paint should be used for a given component (e.g., a panel of the vehicle 18.) For example, the information may be based on past usage rates within the service shop, environmental conditions currently being detected using sensors 24 (e.g., thermometer, barometer, hygrometer, etc.) in the service shop, personal experience of the employees of the service shop, or other information. In additional embodiments, the paint mixer system 30 may mix a batch of paint based on similar criteria, the batch may be delivered to the sprayer/scanner 28 through a gravity feed container.

Figure 4:
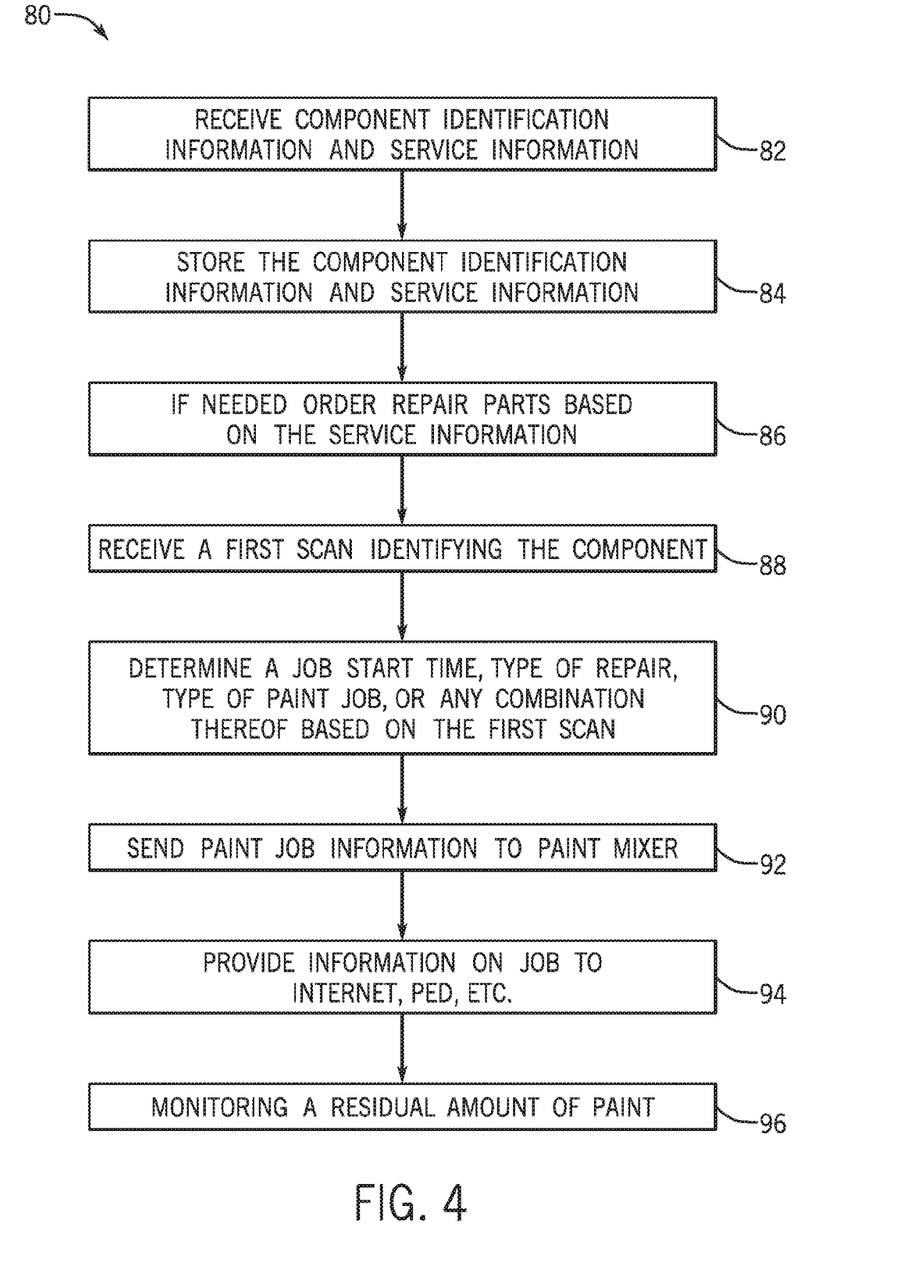
FIG. 4 is a flow chart of a method that may be used by the intra-shop connectivity system of FIG. 1.

FIG. 4 is a flow chart of a method 80 that may be used by the intra-shop connectivity intra-shop connectivity system 10 of FIG. 1. The method 80 begins when the intra-shop connectivity system 10 receives 82 component identification information and service information. The identification information, as disclosed above, may be entered into the intake terminal 20, on the internet 22, through sensors 24, or through the PEDs 26. The service information may include entries such as the repair to be done (e.g., paint panel, bumper, etc.), the desired time frame, color and amount, and/or employee assignment (e.g., who is assigned to do the service job). After the information is received 82, the intra-shop connectivity system 10 stores 84 the vehicle information and service information. The method 80 may be repeated for additional components, and/or may be repeated for the same component to store identification information at a second time (e.g., a second scan indicating an end time of the service job).

The intra-shop connectivity system 10 may store the information on the server 12, so that any device (e.g., intake terminal 20, PED 26, etc.) in the intra-shop connectivity system 10 may access the vehicle and service information. For example, a manager may retrieve information to monitor a job to be done. The intra-shop connectivity system 10 and server 12 may receive and store information for any number of components, depending only on the amount of storage 16 (e.g., memory) within the server 12. The internet protocol 22 may also be utilized, if needed, to order 86 parts based on the service needs entered into the intra-shop connectivity system 10. For example, the server 12 may monitor the spare vehicle parts that are on hand in the service shop and order more parts automatically based on a programmed need. That is, for a given type of part (e.g., car battery), the intra-shop connectivity system 10 may be programmed to have a certain minimum number in the shop (e.g., 5, 10, 15, or more). If the number of parts is less than the minimum number, the intra-shop connectivity system 10 will order 92 over the internet. Additionally, the repair parts may be ordered 86 for specific repairs at the time that the information about the vehicle 18 and/or the repair is stored 84. Additionally, the internet protocol 22 may be used to deliver timing and location information to a secure website. This would enable a customer to look up or be notified when the vehicle 18 has started service or repairs, when parts have been ordered or have arrived, or when the service job has finished and the vehicle 18 is ready to be picked up. Specifically, the server 12 may also utilize the internet protocol 22 to send a first message indicating that the repair has started, and a second message indicating that the repair has ended.

After storing, the intra-shop connectivity system 10 receives 88 a first scan identifying the vehicle 18. For example, the intra-shop connectivity system 10 may receive 88 the scan at the sprayer/scanner 28. The scanner 60 receives the scan of the code, picture, or other identifying feature which may be used to determine 90 a job start time, a type of repair, a type of paint job, or any combination thereof based on the first scan. The intra-shop connectivity system 10 and/or the server 12 may then send 92 the paint job information to the paint mixer system 30 to prepare the paint for application to the vehicle 18, or dispense the mixed paint for use in a gravity feed container or suction feed container (disposable or reusable). As described above, the paint mixer system 30 may provide significant timing and material savings for the service shop. Once the information has been stored 84 or received 88 by the intra-shop connectivity system 10, the information may be provided 94 to the internet 22 and other components of the intra-shop connectivity system 10 (e.g., intake terminal 20, PED 26, etc.). The information may be provided to the internet via a secured web portal such that each customer may securely view information regarding their vehicle 18 securely and privately.

The intra-shop connectivity system 10 may also monitor 96 a residual amount of paint to determine whether an excess amount of paint was mixed. The monitoring over a long period of time and many paint jobs may enable the service shop to refine the amount that the intra-shop connectivity system 10 prepares (i.e., the amount that the server 12 instructs that paint mixer system 30 to mix). The residual amount of paint may be linked and correlated to environmental conditions, manufacturer recommendations, certain employees, and/or individual sprayer/scanners 28. That is, the residual amount of paint may change when the weather is humid/dry or windy, or the residual amount of paint may be consistently high for certain manufacturers and/or specific panels on certain vehicles 18. Also, certain employees may show signs of using too much or too little paint for the paints jobs that they do. Monitoring the residual amount of paint and correlating with the conditions may increase the accuracy with which the intra-shop connectivity system 10 mixes paint.

The systems and methods disclosed herein provide benefits in time and material savings in service shops. Uniform information throughout the service shop provides employees with an accurate idea of what they are expected to work on next and gives them the material and tools they need to quickly finish one job and begin the next. While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A system, comprising:
   an intra-shop connectivity system configured to be positioned within a service shop, comprising:
   a terminal configured to intake a vehicle into the service shop;
   a server configured to store vehicle data associated with the vehicle, wherein the vehicle data comprises vehicle identification information, ordered job information, color of paint for the vehicle, assigned operator, job start time, and job end time; and
   a scanner of a spray gun of a coating system, wherein the scanner is configured to scan a scannable indicia of the vehicle to identify the vehicle and relay the vehicle identification information to the server;
   wherein the intra-shop connectivity system is configured to control an amount and color of paint supplied to the spray gun in the service shop based at least in part on the vehicle identification information.

2. The system of claim 1, comprising the coating system, wherein the coating system comprises a paint mixer configured to trigger mixing of paint in response to identification of the vehicle by the scanner.

3. The system of claim 1, wherein the amount and color of paint are determined by the server.

4. The system of claim 1, wherein the intra-shop connectivity system comprises sensors to determine environmental conditions within the service shop and convey the environmental conditions to the server, and the amount of paint is determined in part on the environmental conditions.

5. The system of claim 1, wherein the server comprises an internet communication protocol configured to deliver the vehicle data to a secure website.

6. A method, comprising:
   receiving, with a processor located within a service shop, identification information and service information relating to a coating process for a vehicle within the service shop;
   storing the identification information and the service information on a server within the service shop accessible from a plurality of locations within the service shop;
   receiving, from a first scanner within the service shop, a first scan of a scannable indicia of the vehicle, the first scan providing a start time of a repair, the coating process, or any combination thereof, and providing an identification of the vehicle; and
   determining, with the processor, an amount of paint to be supplied to a spray gun within the service shop and a color of paint to be supplied to the spray gun within the service shop based on the first scan.

7. The method of claim 6, comprising automatically ordering repair parts based on the service information.

8. The method of claim 6, sending a signal to a paint mixer, wherein the signal comprises information relating to the color of paint and the amount of paint.

9. The method of claim 8, wherein the information is automatically determined, with the processor, based on the identification information and the service information.

10. The method of claim 8, comprising receiving, from sensors, signals indicative of environmental conditions, wherein the information is based at least in part on the environmental conditions.

11. The method of claim 8, wherein the information is based at least in part on previous amounts and corresponding excess amount of paint.

12. The method of claim 8, comprising providing the start time of the repair, the coating process, or any combination thereof and the identification of the vehicle to an internet website.

13. The method of claim 6, comprising receiving, from the first scanner or a second scanner, a second scan identifying the vehicle, wherein the second scan indicates an end time of the repair, the coating process, or any combination thereof.

14. The method of claim 6, comprising monitoring a residual amount of paint leftover after the coating process ends.

15. A system, comprising:
   an intra-shop connectivity system in a service shop, comprising:
   a scanner of a spray gun, wherein the scanner is configured to scan a scannable indicia of a vehicle in the service shop to identify vehicle information of the vehicle, and wherein the scanner is configured to relay the vehicle information to a server in the service shop;
   a coating fluid mixer configured to mix a coating fluid for a coating process; and
   a spray coating apparatus configured to spray coating fluid from a reservoir of the coating fluid mixer; and
   a processor positioned within the service shop, wherein the processor is configured to receive reservoir data from the coating fluid mixer associated with a residual amount of coating fluid left over in the reservoir after the coating process and modify a mixing process of the coating fluid mixer based at least in part on the reservoir data.

16. The system of claim 15, wherein the coating fluid comprises a paint configured for application to the vehicle.

17. The system of claim 15, wherein the processor is configured to receive spray condition data associated with spray conditions of the coating process and correlate the spray condition data with the reservoir data associated with the residual amount of coating fluid left over in the reservoir after the coating process.

18. The system of claim 17, wherein the spray conditions of the coating process comprise environmental conditions, a manufacturer recommendation, an employee identification, a coating apparatus identification, or any combination thereof.

* * * * *